UNITED STATES PATENT OFFICE.

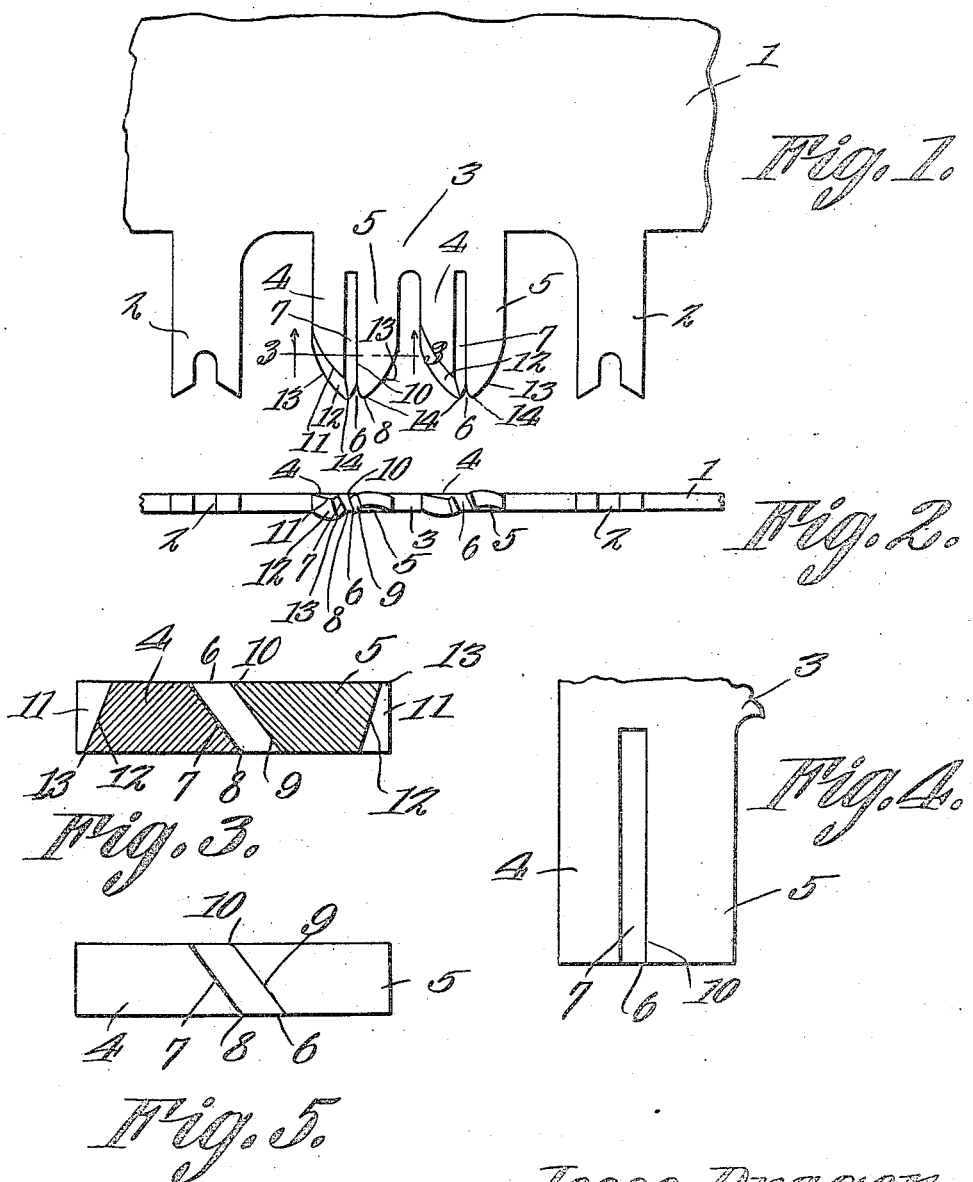

JESSE DRAGON AND CHARLES ANDERSON, OF ENAVILLE, IDAHO.

SAW-TEETH.

1,252,672. Specification of Letters Patent. Patented Jan. 8, 1918.

Application filed September 22, 1915. Serial No. 52,075.

*To all whom it may concern:*

Be it known that we, JESSE DRAGON and CHARLES ANDERSON, citizens of the United States, residing at Enaville, in the county of Shoshone, State of Idaho, have invented a new and useful Saw-Teeth, of which the following is a specification.

The present invention appertains to saws, and relates more particularly to saw teeth, it being the object of the invention to provide novel and improved cutting teeth for a cross cut saw which may be readily formed upon the saw blade, and which will effectively serve their office of cutting the wood with ease and despatch.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a fragmental elevation of a cross cut saw illustrating two pairs of the improved cutting teeth.

Fig. 2 is an edge view of the saw blade looking toward the teeth.

Fig. 3 is an enlarged sectional detail of one pair of cutting teeth, taken on the line 3—3 of Fig. 1.

Fig. 4 is an enlarged elevation of one pair of cutting teeth illustrating the first step of the formation thereof into final shape.

Fig. 5 is an end view of the teeth illustrated in Fig. 4.

The saw blade 1 which is of sheet metal is provided along its cutting edge with the usual raker teeth 2, and is provided with projecting portions 3 between the raker teeth. Each of the portions 3 is provided with two pairs of cutting teeth 4—5. The teeth 4 and 5 project in the same direction from the blade 1 as the raker teeth 2, and the teeth 4 and 5 of each pair are separated by a slot 6 disposed transversely of the blade 1, at an acute angle relative to the blade 1, whereby the adjacent edges of the teeth 4 and 5 are provided with opposite bevels 7 and 9 providing the cutting edges 8 and 10, respectively, at the opposite sides of the blade and projecting in opposite directions past one another. Importance is attached to the fact that the bevels 7 and 9 can be conveniently formed by cutting the oblique slot 6 between the teeth 4 and 5, as illustrated in Figs. 4 and 5, before the teeth 4 and 5 are completed.

The free portions of the teeth 4 and 5 are cut or filed away upon curved lines, as at 11, between the remote edges of the teeth and the outer ends of the cutting edges 8 and 10 thereof, and the cut away or curved portions 11 are beveled, as at 12, upon the same sides of the teeth as the respective bevels 7 and 9, the bevels 12 providing curved cutting edges 13 diverging from the cutting points or noses 14 of the teeth to the remote edges thereof. The free ends or noses of the teeth are set or bent sidewise slightly, as indicated in Fig. 2, whereby the bevels 7 and 9 are moved slightly apart, said bevels remaining substantially parallel, however, the same as before the teeth are bent or set.

When the saw is used for cutting wood, the teeth 4 and 5 will cut into the wood quickly and effectively. When the blade 1 is moved in one direction, the curved cutting edge 13 of the tooth 4 and the straight cutting edge of the tooth 5 will be effective for cutting the wood at the opposite sides of the blade, and when the blade is reversed and moved in the other direction, the cutting edge 13 of the tooth 5 and the straight cutting edge 8 of the tooth 4 will be effective for cutting the wood at the opposite sides, whereby a like cutting effect is accomplished upon both the forward and backward movement of the saw. The teeth 4—5 can be formed readily as above indicated, and also possess a high degree of utility and efficiency in use.

Having thus described the invention, what is claimed as new is:

The saw blade having a pair of parallel juxtaposed cutting teeth extending from one edge at right angles therewith and having a narrow slot therebetween lying in a plane at an acute angle relative to the blade, the adjacent edges of said teeth having opposite parallel bevels providing straight cutting edges projecting past one another in overlapped relation, and free portions of the teeth being cut away on divergent curved lines between the outer ends of the cutting edges and the remote edges of the teeth, the cut away portions being beveled at the same sides of the teeth as the respective aforesaid bevels to provide curved cutting edges, the free ends of the teeth being bent sidewise to separate the first mentioned bevels and cutting edges thereof.

In testimony that we claim the foregoing as our own, we have hereto affixed our signatures in the presence of two witnesses.

JESSE DRAGON.
CHARLES ANDERSON.

Witnesses:
J. H. MUNSON,
S. P. FAIRWEATHER.

Copies of this patent may be obtained for five cents each, by addressing the "Commissioner of Patents, Washington, D. C."